Jan. 29, 1935.  C. IVERSON  1,989,364
VULCANIZER
Original Filed June 3, 1932    7 Sheets-Sheet 2

INVENTOR
CATO IVERSON.
BY
Ely H Barrow
ATTORNEYS

Jan. 29, 1935.  C. IVERSON  1,989,364
VULCANIZER
Original Filed June 3, 1932  7 Sheets-Sheet 4

INVENTOR
CATO IVERSON
BY
Oly & Barrow
ATTORNEYS

Jan. 29, 1935.  C. IVERSON  1,989,364
VULCANIZER
Original Filed June 3, 1932  7 Sheets-Sheet 5

INVENTOR
CATO IVERSON
BY
Ely & Barrow
ATTORNEYS

Jan. 29, 1935.   C. IVERSON   1,989,364
VULCANIZER
Original Filed June 3, 1932   7 Sheets-Sheet 6

INVENTOR
CATO IVERSON
BY Ely & Barrow
ATTORNEYS

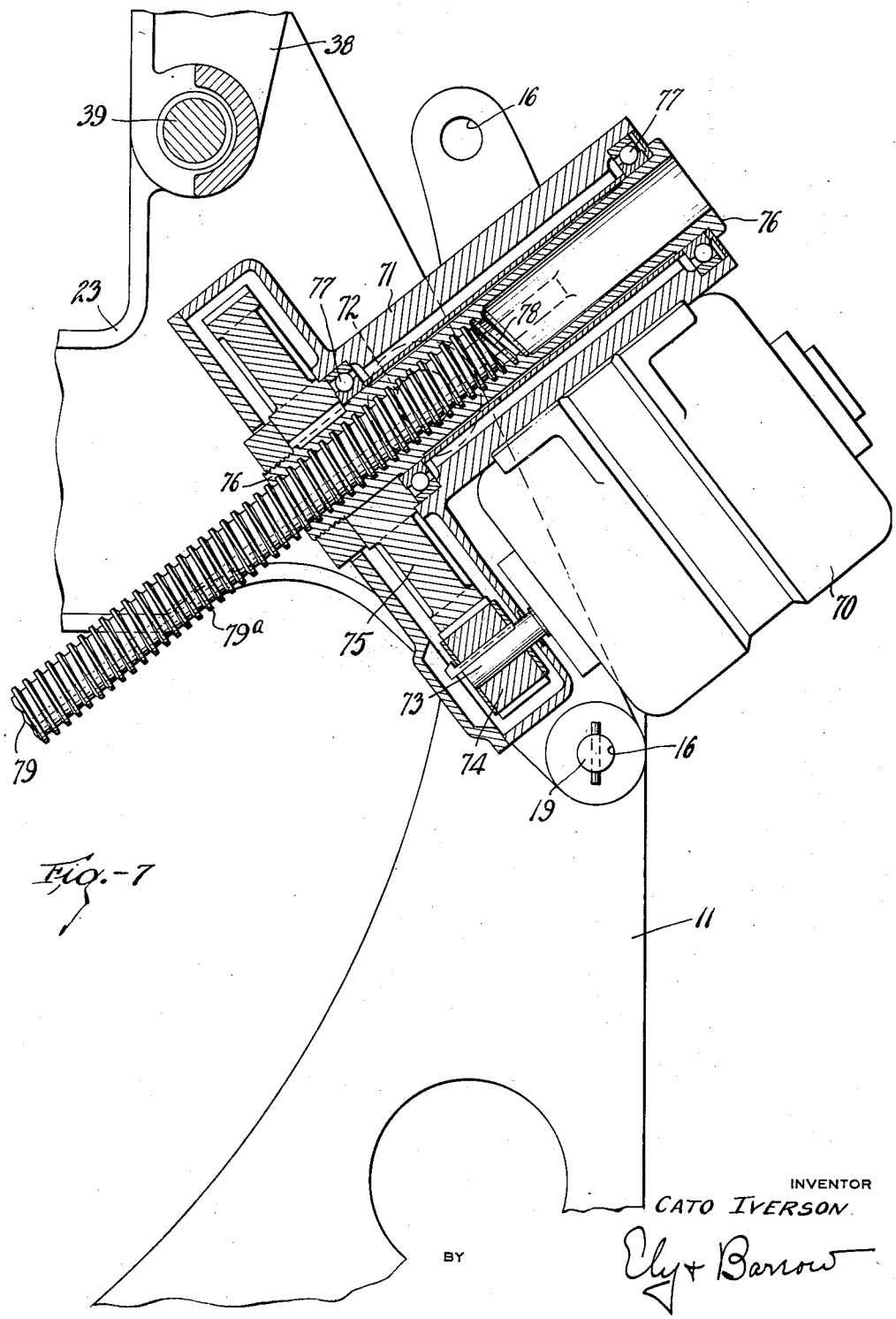

Patented Jan. 29, 1935

1,989,364

UNITED STATES PATENT OFFICE 1,989,364

VULCANIZER

Cato Iverson, Akron, Ohio, assignor to National Rubber Machinery Company, Akron, Ohio, a corporation of Ohio Application June 3, 1932, Serial No. 615,169
Renewed August 18, 1934

13 Claims. (Cl. 18—17)

This invention relates to vulcanizers, and more especially it relates to vulcanizers of the single unit or watch-case type commonly used for the vulcanization of pneumatic tire casings and inner tubes.

Vulcanizers of the character described as heretofore provided either have been opened and closed by a hinging action of one or both mold sections, or the mold sections have separated by relative movement in an axial direction while disposed parallel to each other. In those vulcanizers wherein the mold sections open with a hinging action there is a progressive separation of the mold sections and the work which is advantageous and desirable, but this type of vulcanizer precludes the desirable complete rimming of a tire before the molds completely close, and frequently results in displacement of a tire in the mold during the closing operation. In vulcanizers wherein the mold sections open and close in an axial direction the rimming operation is simplified, but the advantageous progressive separation of mold and work, in the opening of the vulcanizer, is sacrificed.

The chief objects of this invention are to provide a watchcase vulcanizer that will include the advantageous features of both types of vulcanizers mentioned; to provide improved tire-rimming mechanism in such a vulcanizer; and to provide a vulcanizer that may be adjusted to alter the normal plane of the work to suit the requirements of various tire-manufacturing concerns. More specifically the invention aims to provide a vulcanizer that will open with a hinging action of the respective mold sections, and close with a relative movement of the mold sections in an axial direction while disposed in parallel planes; and to provide mechanism for completely rimming a tire in the vulcanizer before either mold section comes into contact with the tire. Other objects include uniformity of vulcanization in the work; and the prevention of damaged or blemished work due to movement thereof after it has been engaged by hot mold sections.

Of the accompanying drawings,

Figure 7 is a sectional detail view of the power means for operating the vulcanizer.

Figure 1:
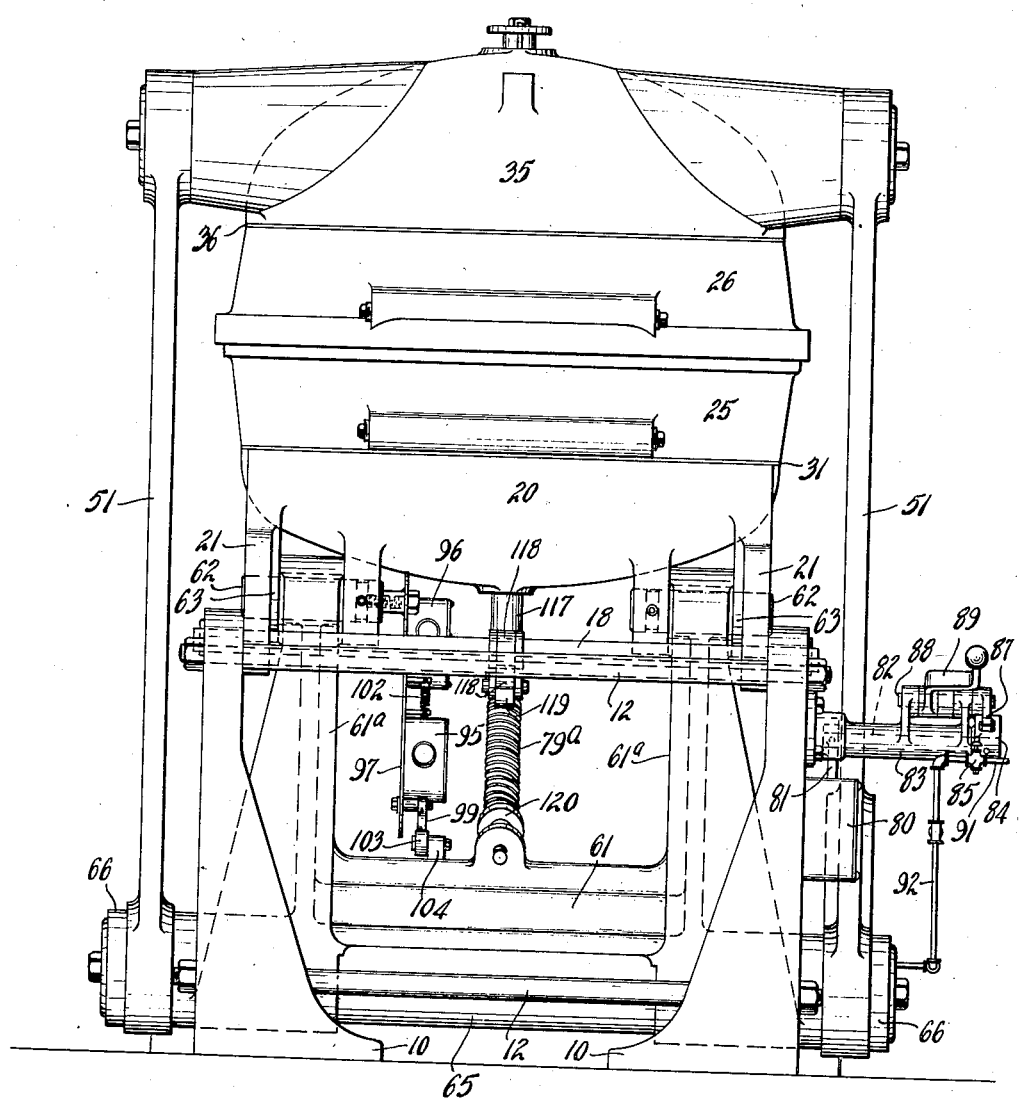
Figure 1 is a front elevation of a vulcanizer embodying the invention, in its preferred form, the vulcanizer being in closed, or vulcanizing position.

Referring to the drawings, the vulcanizer is supported upon four base-pedestals, namely, 10, 10 at the front and 11, 11 at the rear, the pedestals 10 being laterally braced and connected to each other by tie-bars 12, 12; and the pedestals 11 being similarly connected by tie-bars 13, 13. The respective base-pedestals 10 are formed with a slightly arcuate series of three apertures 15, 15, the apertures of one pedestal being axially aligned with those of the other. The respective base-pedestals 11 are formed with a similar but reversely arcuate series of seven apertures 16, 16. A bar 18 having its respective end portions extended through apertures 15 is supported by the base-pedestals 10, and a bar 19 is similarly supported in apertures 16 of the base-pedestals 11. The bars 18, 19 provide a four-point support for the entire operative mechanism of the vulcanizer, the arrangement being such that the angularity of said mechanism may be selectively altered so that the plane of the work, and the parting plane of the mold sections, may be varied from horizontal to an inclination of substantially 30 degrees with the low point at the front of the vulcanizer.

The drawings show the work in horizontal position with the bar 18 in the uppermost apertures 15 and the bar 19 in the lowermost apertures 16. When the bar 18 is in the lowermost apertures 15 and the bar 19 is in the uppermost apertures 16 the work will be disposed at an angle of 30 degrees to the horizontal. The other apertures 15, 16 permit adjustments of the vulcanizer to other angles up to 30 degrees. Thus the specifications of various tire manufactures as to angularity of the vulcanizer are met in a single apparatus, and flexibility is provided so that the angularity is easily changed if and when desired.

Mounted upon the bars 18, 19 is the lower normally stationary platen 20 of the vulcanizer, said platen being formed with a pair of forwardly-extending arms 21, 21 that engage the bar 18 adjacent the respective ends thereof. Secured to the rear side of the platen by bolts 22, 22 are right and left brackets 23, 23 that engage the bar 19 adjacent the respective ends thereof.

Mounted upon the stationary platen 20 is the lower section 25 of an annular, two-part, steam-jacketed mold comprising mating sections 25, 26, said mold sections defining an internal molding cavity 27 for a pneumatic tire casing. A tire casing 28 is shown in the molding cavity 27, and an expansible core 29 is shown within the tire casing, said core being supplied with heated pressure fluid in the usual manner (not shown). Steam chambers in the respective mold sections are shown at 30, 30, and steam may be supplied to said chambers through any suitable or usual connections (not shown). Preferably, a sheet of heat-insulating material 31, such as asbestos, is disposed between the mold section 25 and the platen 20, and the mold section is secured to the latter by bolts 32 or other suitable means.

The upper mold section 26 is mounted upon the under side of an upper, movable platen 35, there being a layer of heat-insulating material 36 between the mold section and platen, and the mold section being secured to the platen by bolts 37 or the like. The platen 35 is formed with a pair of angular, rearwardly extending arms 38, 38 that are pivotally mounted upon a hinge-pin 39, the respective end portions of the latter being formed with oppositely disposed flat surfaces 40, 40 (see Figure 6) and slidably and non-rotatively mounted for lateral movement in respective vertical slots 41, 41 formed in the brackets 23. Set-screws 42, 42 extending into the slots 41 at the top and bottom thereof are provided for adjustably limiting the vertical movement of the hinge-pin 39 in the said slots. In the normal closed or operative position of the vulcanizer, the hinge-pin 39 is at the bottom of the slots 41, wherein it is in the parting plane of the mold sections.

Figure 5:
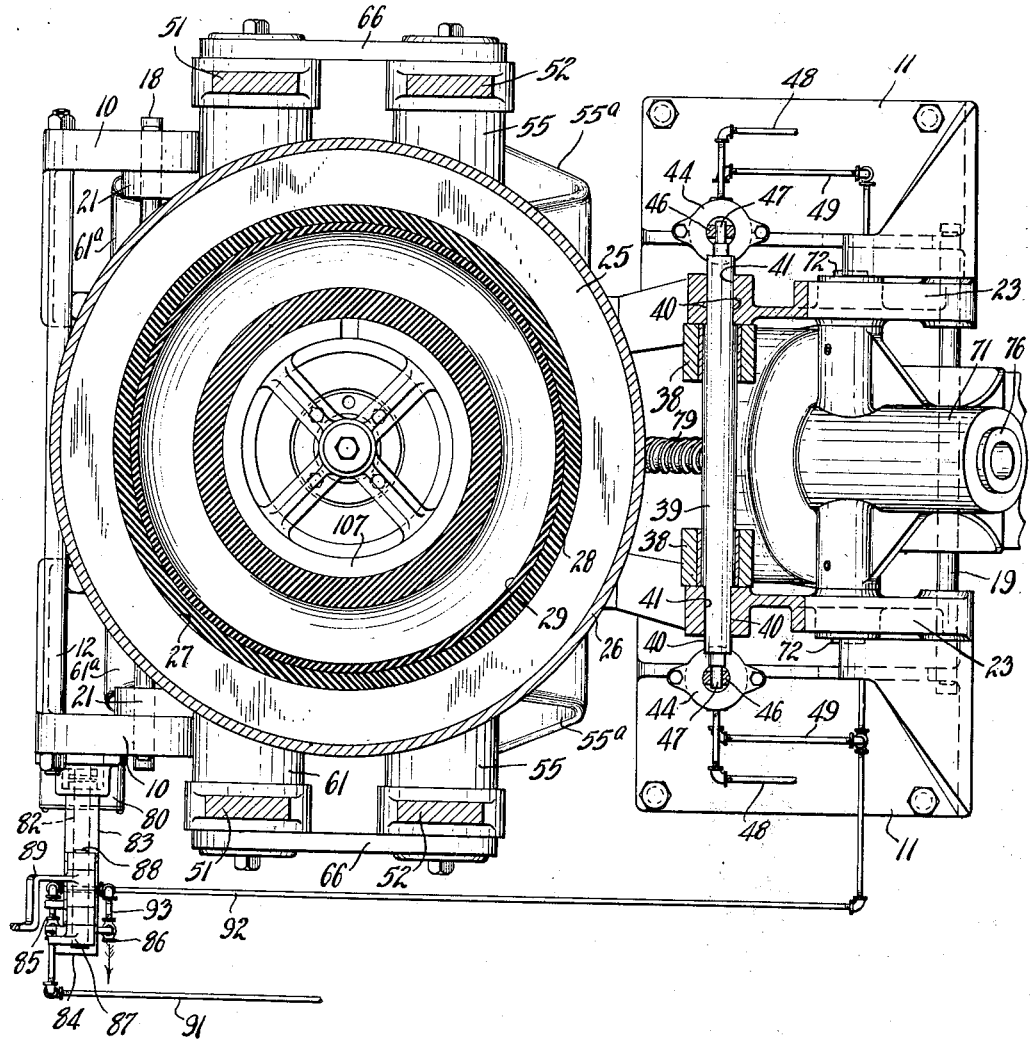
Figure 5 is a section on the line 5—5 of Figure 2.

For moving the hinge-pin 39 upwardly in the slots 41, upon occasion as subsequently will be explained, there is provided a pair of fluid pressure operated cylinders 44, 44, Figure 5, that engage the respective end portions of said hinge-pin. The cylinders 44 are arranged to operate concurrently, and are identical in construction so that a description of one of them will be sufficient.

Figure 6:
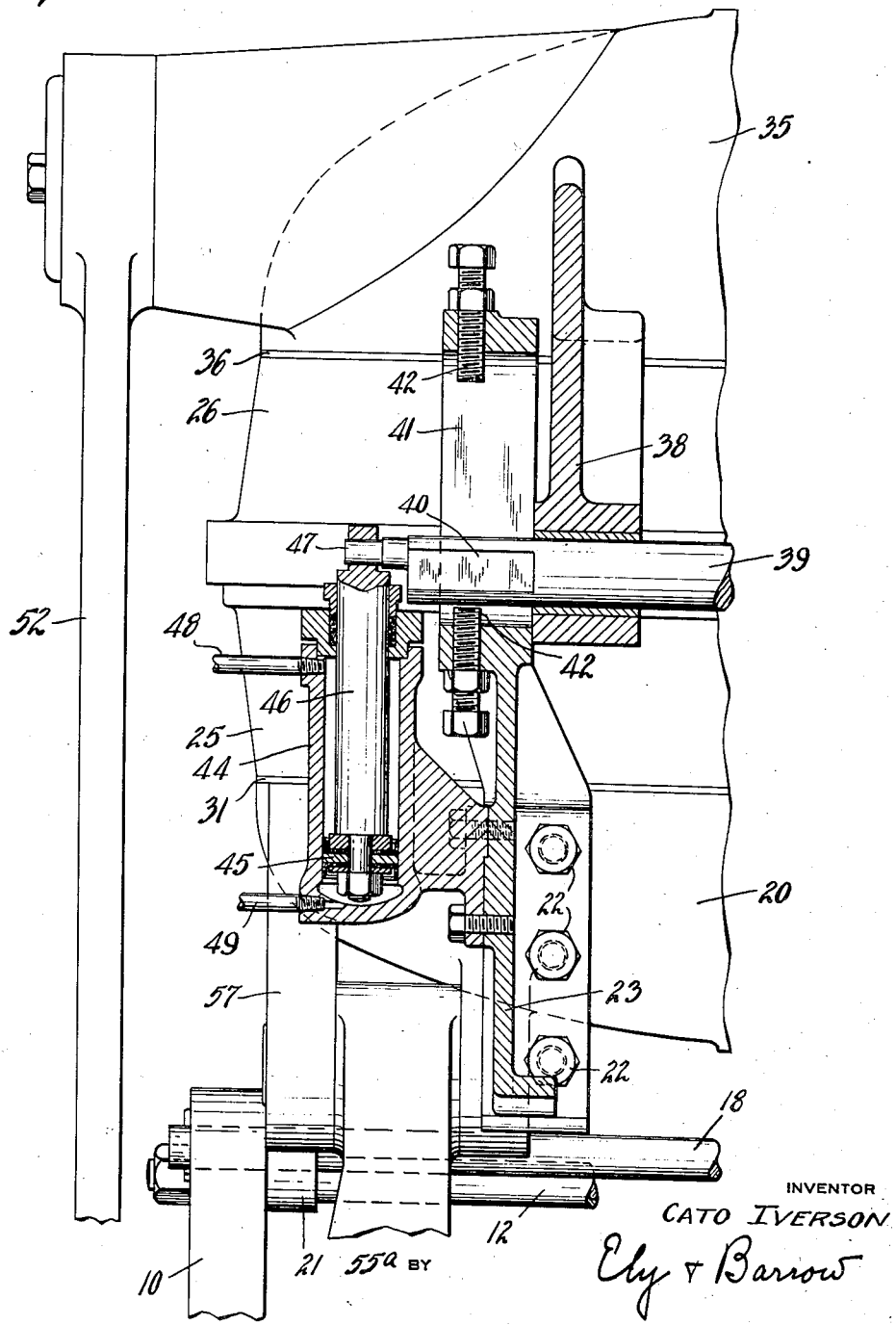
Figure 6 is a section on the line 6—6 of Figure 2, on a larger scale.

As is most clearly shown in Figure 6, each fluid pressure cylinder 44 is mounted upon a bracket 23 below the hinge-pin 39 and comprises a piston 45, and a relatively large piston rod 46 that extends upwardly and has its upper end pivotally connected to a trunnion 47 formed eccentrically on the end of the hinge-pin. Fluid inlet and outlet pipes 48, 49 communicate with the cylinder chamber at its upper and lower ends respectively. Preferably, an elastic fluid such as air is used, and line pressure is maintained constantly in the pipe 48, on the upper side of the piston 45. Line pressure is admitted to the lower end of the cylinder, upon occasion, through the pipe 49, and because of the differential areas of the upper and lower sides of the piston, by reason of the large piston rod on the upper side thereof, the piston is moved upwardly, the pressure fluid in the upper end of the cylinder being forced back in the line through the pipe 48.

The raising and lowering of the upper platen 35, to open and close the mold, is effected by mechanism comprising pairs of links 51, 52 pivotally connected at their upper ends to opposite sides of said upper platen, and connected at their lower ends to power mechanism presently to be described. The pivotal connections at the upper ends of the links 51, 52 include angularly adjustable shafts 53, 53 that extend transversely of the upper platen, the respective end portions of said shafts being formed with eccentric portions to which the links 51, 52 are connected, whereby limited longitudinal adjustment of the latter is made possible. The lower ends of the links 52, 52, which links are positioned rearwardly of the links 51, are pivotally connected to a generally U-shaped toggle link 55, the latter being formed with respective legs 55ª, 55ª that are rearwardly bent in their middle portions, the free ends of said legs being pivotally connected at 56, 56 to respective lugs 57 formed on the bottom of the lower platen 20 at opposite sides thereof. The connections between the links 52 and the toggle link 55 are lost motion connections, there being a shaft 58 carried by the toggle link, the end portions of the said shaft being disposed in respective slots 59 formed in the end portions of the links 52.

The lower ends of the front links 51 are pivotally connected to a toggle link 61 that is similar to the toggle link 55 except that its respective legs 61ª, 61ª are forwardly bowed. The free ends of the legs 61ª are pivotally connected at 62, 62 to respective lugs 63 formed on the bottom of the lower platen 20. The body portion of the toggle link 61 carries a shaft 64 to the end portions of which the respective links 51 are connected. The said body portion of the toggle link is suitably cut away in its medial portion to permit a cross-head 65 to be mounted upon the shaft 64, and it is to said cross-head that power means is connected for operating the toggle link. The toggle links 55, 61 are arranged to act in unison by means of connecting links 66, 66 that connect the adjacent end portions of the shafts 58, 64 to each other.

Power means for opening and closing the vulcanizer comprises a reversible motor 70 that is mounted upon a housing structure 71 that is pivotally mounted on pivot pins 72, 72 upon and between the brackets 23. As is most clearly shown in Figure 7, the shaft 73 of the motor 70 is provided with a pinion 74 that is meshed with a gear 75 that is keyed on an elongate nut 76 that is journaled for rotary movement in bearings 77, 77 in the housing 71. The nut 76 is formed with female screw threads 78 for engagement with the threaded end portion 79ª of an operating rod 79, the other end of said rod being connected to the cross-head 65. The arrangement is such that driving of the motor 70 in either direction will move the operating rod 79 longitudinally and thus swing the toggle links 55, 61.

The starting of the motor 70 is controlled by a reversing switch 80 that in one position causes the motor to rotate in one direction and in another position causes it to rotate in the opposite direction. Associated with the mechanism for operating the switch 80 is mechanism controlling the operation of the fluid pressure cylinders 44, the arrangement being such that the motor is started and the cylinders actuated in determinate timed relation to each other.

The reversing switch 80 is mounted upon the outer face of one of the pedestals 10, and is operated by a lever 81 that is mounted upon the rear end of a shaft 82 that is journaled in a suitable bracket 83 also mounted upon the pedestal 10. A tension spring (not shown) connected to the lever 81, within the switch box 80, normally urges the lever 81 toward the position shown in Figure 3. Mounted upon the front end of the shaft 82 is an air control lever 84 that is formed with oppositely extending arms that engage respective air valves 85, 86. Movement of the lever 84 is controlled by a cam 87 that is mounted upon a countershaft 88 that is disposed parallel to shaft 82 and is journaled in suitable bearings formed on the bracket 83. An operating lever 89 is mounted centrally upon the countershaft 88.

Figure 3:
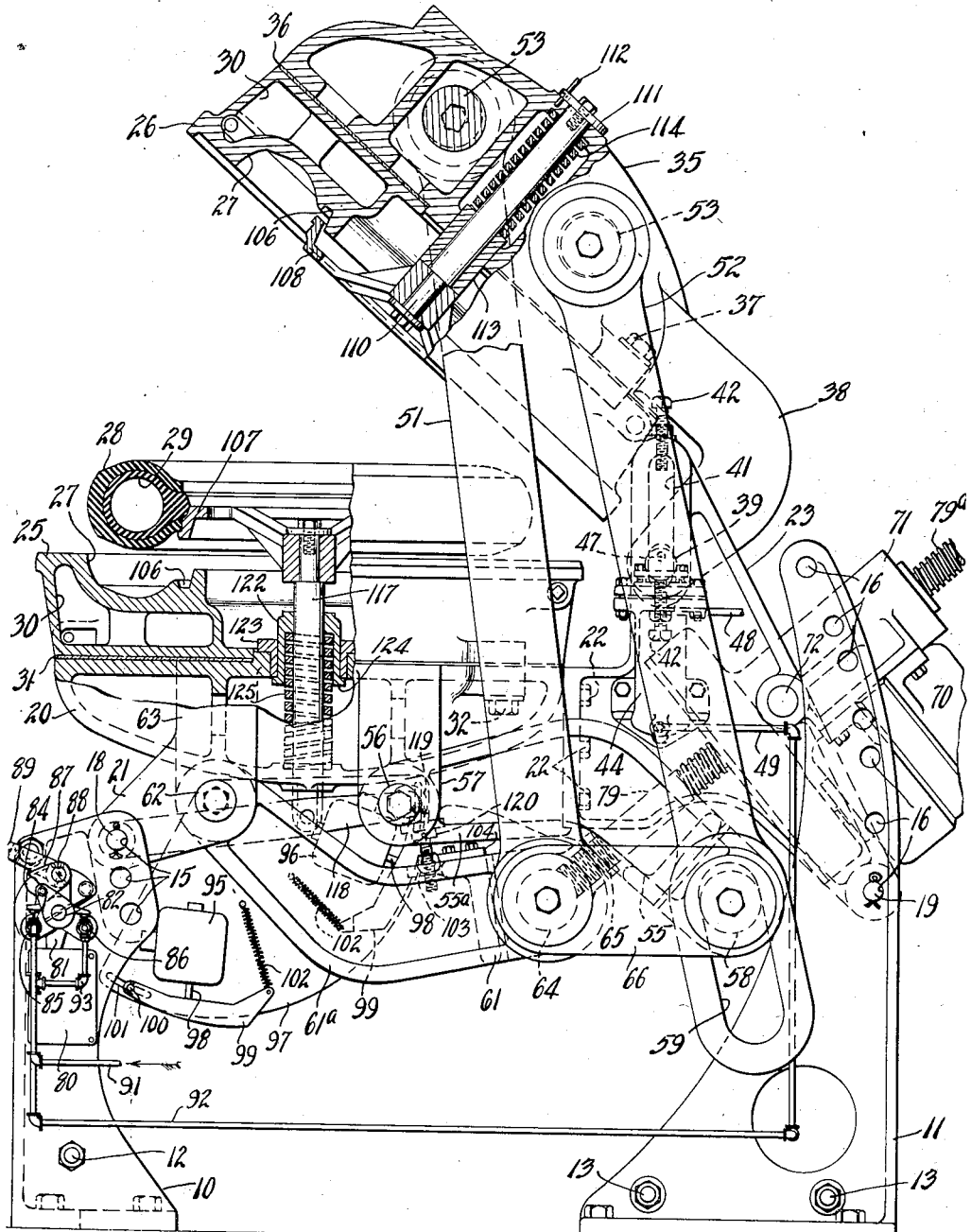
Figure 3 is a side elevation showing the vulcanizer in fully open position, and the work therein, parts being broken away and in section.

The air valve 85 is a two-way valve to the inlet port of which is connected a pipe 91 that extends to a source of pressure fluid (not shown), which source may be and preferably is the same as that for the pipes 48 of the cylinders 44, the pressure in pipes 48, 91 being the same. The outlet port of valve 85 connects with a pipe 92 that communicates with both pipes 49 that extend to the lower end of each cylinder 44. The air valve 86 is a bleeder valve of smaller capacity than the pipe 92 to which one port of the valve is connected by pipe 93, the other port of the valve 86 being an exhaust port. The arrangement is such that when one of the valves 85, 86 is open, the other is closed. In Figure 3 the valve 86 is open and the valve 85 is closed.

In addition to the reversing switch 80, the motor control includes limit switches 95, 96 which are arranged to disconnect power to the motor 70 at determinate points in the opening and closing movements of the vulcanizer. The switches 95, 96 are mounted upon a quadrant 97 that is fixedly secured, below the lower platen 20, to the hinge-pin 62 and elsewhere (not shown). Each limit switch is provided with an operating push-rod 98 that is normally urged outwardly by a suitable spring (not shown) within the switch box. The outer ends of the push-rods 98 are engaged by respective levers 99 that are pivotally mounted upon pivot pins 100 that are mounted in respective slots 101, 101 in the quadrant for adjusting the operative positions of said levers. The free ends of the levers 99 are connected to respective tension springs 102 which hold the levers against the push-rods 98. A portion of each lever 99 extends into the orbit of a cam-roller 103 that is mounted upon a bracket 104 that is carried by the toggle link 61. The arrangement is such that one of the limit switches 95, 96 is actuated by the cam roller 103 to stop the motor 70 when the upper platen 35 reaches a fully raised or fully lowered position.

Figure 2:
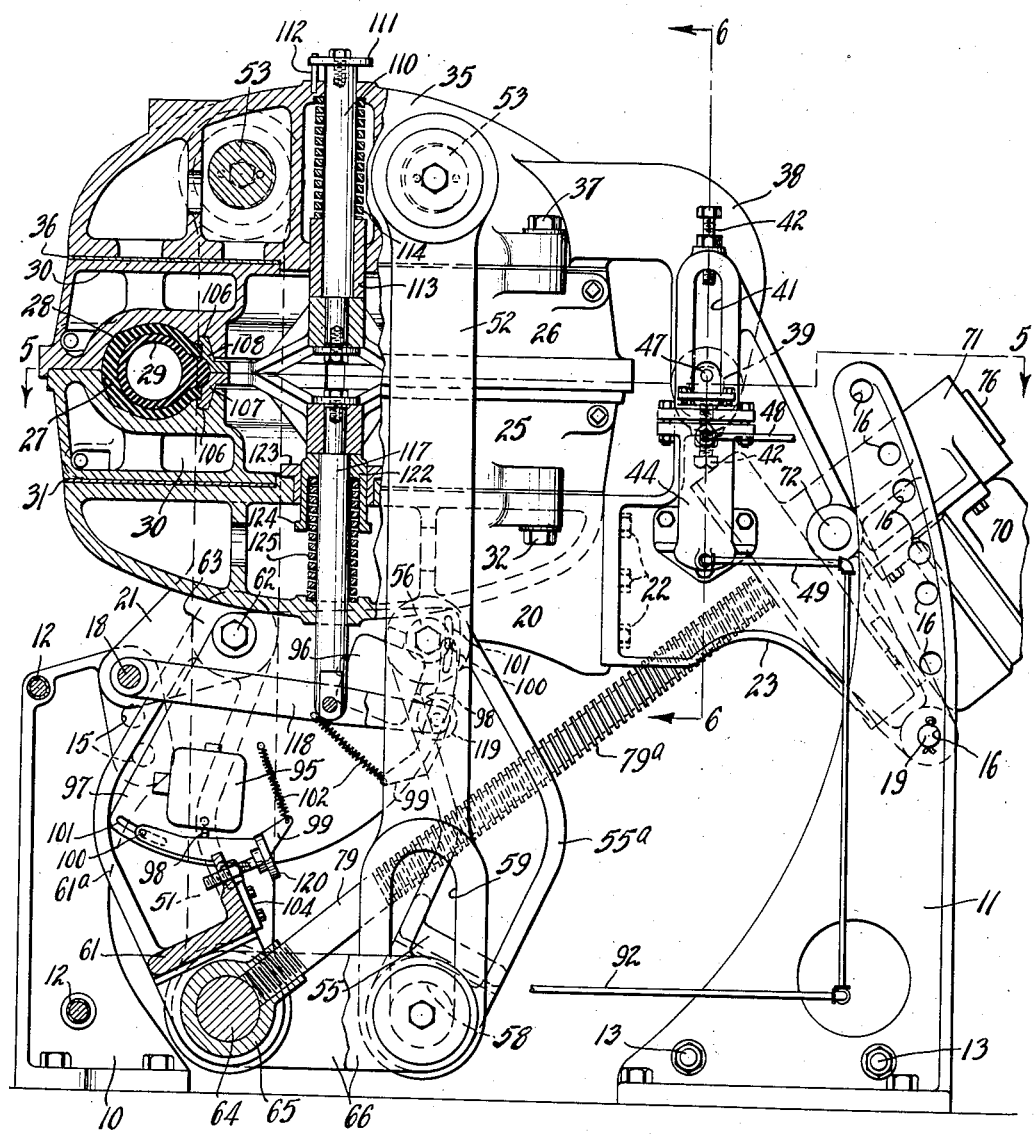
Figure 2 is a side elevation thereof, and the work therein, from the right of Figure 1, parts being broken away and in section.
Figure 4:
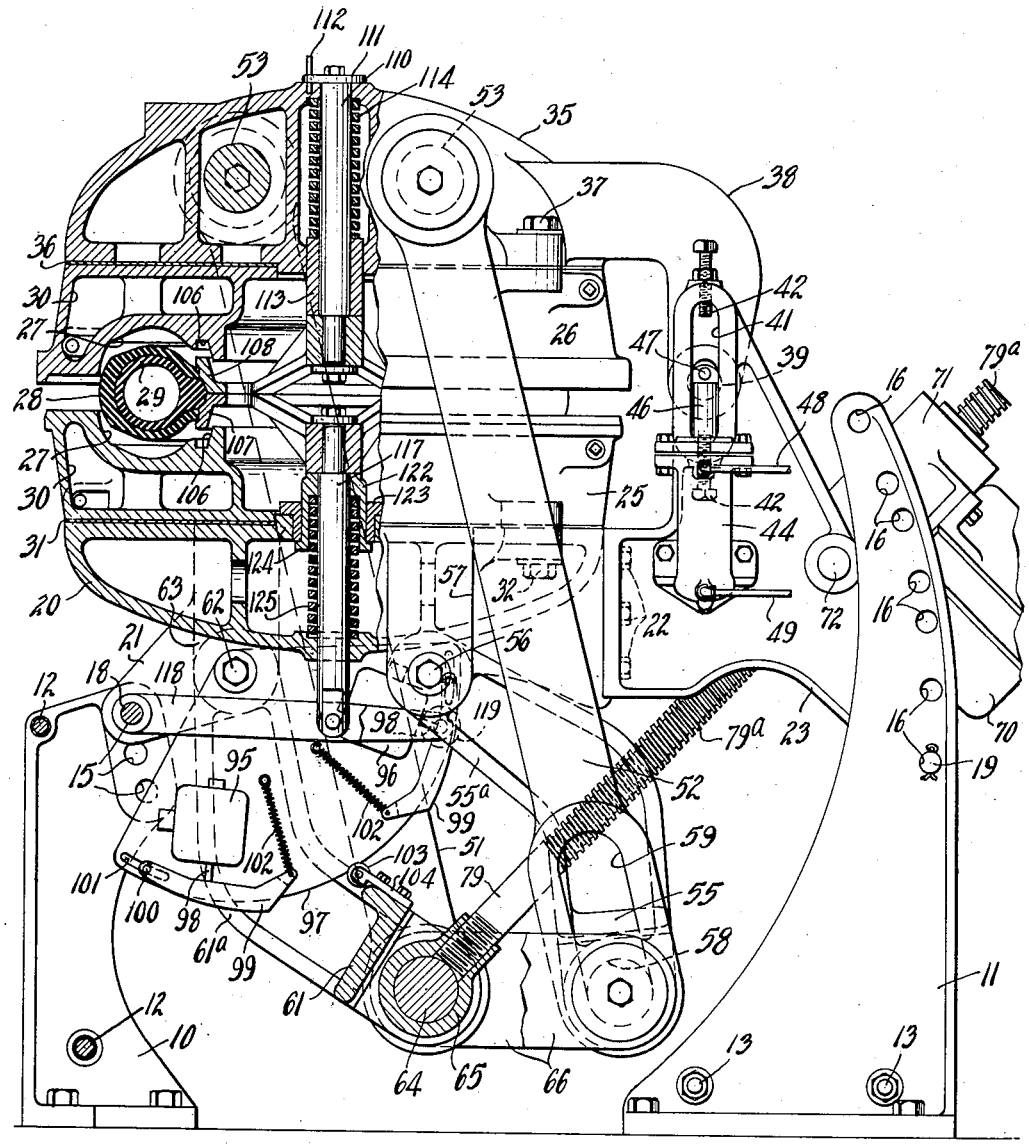
Figure 4 is a side elevation of the vulcanizer and the work therein as they appear during the closing movement of the vulcanizer, parts being broken away and in section.

As is most clearly shown in Figures 3 and 4, the molding cavity 27 in the respective mold sections 25, 26 includes seats 106, 106 in said sections for respective annular bead-clamping rings 107, 108 that are utilized for rimming the tire 28. Both bead clamping rings comprise a plurality of spokes, and an axial hub portion as shown, said spokes and hub portions being disposed within the axial recesses of the respective annular mold sections 25, 26. Each spoke structure is oppositely dished or frusto-conical in form so that the hub portions are somewhat separated from each other when the bead rings are in clamping engagement with the beads of a tire casing as is shown in Figures 2 and 4.

The upper bead clamping ring 108 is mounted upon the lower end of a spindle 110 that extends axially through the hub of said bead ring, and extends upwardly through the upper platen 35, said spindle having a slotted plate or cap 111 secured to its upper end, exteriorly of the upper platen. A pin 112 in the top of the platen 35 engages the slot in the plate 111, the arrangement being such as to prevent angular movement of the spindle 110, the latter being of such length as to be capable of some longitudinal movement. The spindle 110 is embraced by a short sleeve 113 that rests upon the hub of the bead ring 108 and is slidable in the platen structure, and a helical compression spring 114 is mounted upon the spindle between the sleeve 113 and the upper wall of the upper platen. The arrangement is such that the bead ring 108 normally stands in spaced relation axially of its seat 106 in the mold section 26 when the vulcanizer is partly or completely open, as is shown in Figures 3 and 4, yet may be forced into said seat, against the pressure of the spring 114, by the closing of the vulcanizer, as is shown in Figure 2.

The lower bead ring 107 is mounted upon the upper end portion of an axial spindle 117 that extends axially through the lower platen 20 and projects from the bottom thereof where it is pivotally connected to the intermediate portion of a lever 118 that is fulcrumed at one end upon the supporting bar 18. The free end of the lever 118 is provided with a roller 119 that is positioned in the orbit of an abutment member 120 that is adjustably mounted upon the toggle link 61. The spindle 117 slides freely in a sleeve 122 that is mounted thereon, and said sleeve slides freely in a bushing 123 mounted in an axial aperture in the upper wall of the lower platen 20, said sleeve being formed at its lower end with a radial flange 124 adapted to abut the bushing 123 to limit the upward movement of said sleeve. The under side of the sleeve 122 is formed with a counterbore to receive the upper end of a compression spring 125 that is mounted upon the spindle 117 between said sleeve and the bottom wall of the lower platen 20. The arrangement is such that the spring 125 normally yielding supports the bead ring 107 above its seat in the mold section 25 when the vulcanizer is partly open, and the lever 118 and toggle link 61 provide means for lifting the bead ring to still greater elevation when the vulcanizer is fully open.

*Operation*

A cycle of operation of the vulcanizer will be described starting with the vulcanizer in the closed position shown in Figure 2, in which position the operating lever 89 is down, the valve 85 is open and the valve 86 is closed. This means that there is fluid pressure in the lower end of cylinder 44, but such pressure is incapable of producing any movement since it is opposed by the toggle mechanism which holds the upper platen 35 in closed position.

When vulcanization of the tire 28 is completed, the operator vents the expansible core 29, and then lifts the operating lever 89 to the position shown in Figure 3. This closes the valve 85 and opens valve 86 whereby fluid in the lower end of the cylinder 44 is released therefrom. The lifting of lever 89 also moves lever 81 to operate the reversing switch 80 for driving the motor 70, the latter rotating in the proper direction to feed the operating rod 79 rearwardly. This movement of the operating rod moves the toggle links 55, 61 in unison about their pivots 56, 62 whereby upward pressure is applied to the movable platen 35 through the links 51, the links 52 being inoperative because of their lost motion connection with toggle link 55. The arrangement is such that the movable platen 35 rises with a hinging or pivotal movement about hinge pin 39, the latter remaining stationary at the lower end of slot 41 by reason of the fluid pressure constantly in the upper end of cylinder 44.

As the upper platen rises in the manner described, the upper mold section 26 is stripped from the tire 28 progressively from the front toward the read thereof, it being common practise to soap or otherwise lubricate the upper mold section so that the work will have greater adhesion to the lower mold section. As the upper platen rises and the mold section is stripped from the tire, the compression spring 114 forces the upper bead ring 108 axially out of its seat 106 so that it assumes the position shown in Figure 3, in spaced relation to the upper mold section 26. Upon removal of the upper mold section from the tire, the pressure of the spring 125 usually is sufficient to lift the lower bead ring 107 from its seat to about the height shown in Figure 4, which is the extent permitted by the sleeve 122, and thus to strip the tire from the lower mold section 25. However, near the completion of the opening movement of the vulcanizer the abutment 120 on the toggle link 61 engages the roller 119 on the end of lever 118 and lifts the spindle 117 and bead ring 107 to the extreme elevated position shown in Figure 3. As the mechanism approaches the position shown in Figure 3, the cam roller 103 on the toggle link 61 engages and moves the lever arm 99 that controls limit switch 96, thus operating the latter and stopping the motor drive.

In the extreme elevated position of the bead ring 107 the tire 28 is clear of the lower mold section 25 so that the tire is easily lifted off the bead ring and replaced by an unvulcanized tire. After fluid pressure connection is made with the expansible core in the unvulcanized tire, the vulcanizer is ready for closing.

Closing of the vulcanizer is effected by moving the operating lever 89 downwardly, which operation throws the reversing switch 80 to drive the motor in the opposite direction from the direction that it rotated in opening the vulcanizer, and concurrently opens the valve 85 and closes the valve 86. Rotation of the motor feeds the operating rod forwardly, and opening of valve 85 permits pressure fluid from pipe 91 to flow into pipe 92 and through branch pipes 49 to the lower ends of both cylinders 44, with the result that the piston rods 46 of said cylinders are projected upwardly, pressure fluid in the upper ends of the cylinders being forced back into the pipe lines 48. This movement of the piston rods 46 carries the hinge pin 39 to the upper ends of slots 41, causing the upper platen 35 and mold section 26 to assume a parallel, axially aligned relationship to the lower platen 20 and mold section 25 respectively. In assuming the parallel position described, the upper platen pivots around the forward shaft 53 so that rear shaft is elevated, and the link 52 raised to take up the lost motion therein so that both links 51, 52 cooperate in forcing the movable platen downwardly.

The forward movement of the operating rod 79 swings the toggle links 55, 61 downwardly about their pivots, and thus draws both links 51, 52 downwardly with a parallel motion against the fluid pressure in the lower end of cylinder 44, the pressure fluid in the latter being thereby forced back into the pipe line 91, but still exerting pressure on the piston of said cylinder so that the pivot pin 39 is supported and the upper platen maintained in horizontal position.

As the toggle link 61 starts its downward movement, the abutment 120 moves away from the roller 119 on the lever 118, permitting the spindle 117, and the bead ring 107 with a tire thereon to move downwardly substantially to the position shown in Figure 4, in which position they are supported out of engagement with the lower mold section 25, by the spring 125. As the movable platen reaches the position shown in Figure 4, the tire 28 is engaged by the upper bead ring 108 and completely rimmed throughout its circumference before any part of the tire touches either mold section. Thus any relative movement of the tire occasioned by the rimming operation will not result in blemishes such as occur when a tire is moved relatively of a hot mold section after being in contact therewith.

In the final closing movement of the vulcanizer, after the bead rings 107, 108 are brought together, said bead rings move into their respective seats 106 against the pressure of the compression springs 114, 125. Just before the vulcanizer reaches fully closed position the cam roller 103 engages the lever 99 and operates the limit switch 95 to stop the drive of the motor 70. The arrangement is such that the motor is fully stopped as the vulcanizer reaches fully closed position, the toggle structure being on dead center so as effectively to resist the fluid pressure of the expansible core 29 in the tire 28. Fluid pressure may be admitted to said expansible core as soon as the vulcanizer is closed. This completes one cycle of operations of the vulcanizer, which may be repeated as described as soon as the tire 28 is vulcanized.

The vulcanizer is especially useful for vulcanizing pneumatic tire casings having white side walls, since these tires are easily blemished in ordinary vulcanizers. The invention also results in uniformity of vulcanization throughout the work, and achieves the other advantages set forth in the foregoing statement of objects.

Modification may be resorted to without departing from the spirit of the invention or the scope of the appended claims.

What is claimed is:

1. In a vulcanizer the combination of a pair of mating mold sections, a hinge for one of said sections, means for moving said section on said hinge to open the mold, means for moving the hinge to bring the hinged section into parallelism with the other section, and means for bringing the mold sections together to close the mold while they remain in parallelism.

2. In a vulcanizer the combination of a stationary and a movable mold section, a hinge for the movable mold section, means for shifting the position of said hinge, and a pair of toggle mechanisms associated with said movable mold section, one of said toggle mechanisms being operative only in the opening of the mold, and both being operative in the closing thereof.

3. A combination as defined in claim 2 including power means for operating the toggle mechanisms, and means for operating said power means and the hinge shifting means in timed relation to each other.

4. In a vulcanizer, the combination of a stationary and a movable mold section, a hinge upon which the movable mold section is pivotally mounted, means for shifting the position of said hinge, and a pair of toggle mechanisms for moving the movable section to open and close the mold, one of said toggle mechanisms including a lost motion connection whereby said mechanism is inoperative in the opening of the mold.

5. In a vulcanizer, the combination of a stationary mold section and a movable mold section, a hinge pin about which the movable section is adapted to pivot, fluid pressure means for shifting the position of said hinge pin, when the vulcanizer is open, a toggle mechanism for swinging the movable section about said hinge pin to open the vulcanizer, and an additional toggle mechanism cooperating with the first-mentioned toggle mechanism for closing the vulcanizer while maintaining the mold sections in parallelism.

6. In a vulcanizer, the combination of a fixed platen and a movable platen, respective mating mold sections secured to said platens, a hinge-pin upon which the movable platen pivots, fluid pressure cylinders connected to the respective end portions of the hinge-pin for altering the position thereof, when the vulcanizer is open, toggle mechanism adapted to open the vulcanizer by a hinging movement of the movable platen and to close the vulcanizer while the platens are in parallelism, power means for operating the toggle mechanism, and control means for concurrently activating the power means to close the press and for so charging the fluid pressure cylinders as to shift the hinge-pin to change the angular position of the platens to one of parallelism.

7. In a vulcanizer, the combination of a tire mold comprising a pair of mating tire-molding sections, means for opening the mold with a hinging movement of the sections and for closing the mold by bringing the sections together in parallelism, bead-engaging rings seating in the respective mold sections, and supporting means for said bead rings adapted to effect complete rimming of a tire before the latter is engaged by either mold section in the closing of the mold.

8. In a vulcanizer, the combination of an annular tire mold comprising a pair of mating mold sections, means for moving the sections from and toward each other to open and close the mold, bead rings seating in concentric grooves in the respective sections, axial spindles upon which said bead rings are mounted, and yielding means on said spindles normally urging the bead rings out of their seats when the mold is open.

9. A combination as defined in claim 8 including a lever connected to one of the bead ring spindles, and means for moving the lever to move the bead ring beyond the point that it is normally moved by the yielding means in the opening of the mold.

10. In a vulcanizer, the combination of a stationary platen and a movable platen, respective annular tire mold sections mounted upon said platens, toggle mechanism for raising and lowering the movable platen, tire-bead rings seating in concentric grooves in the respective mold sections, axial spindles upon which said bead rings are mounted, yielding means normally urging the bead rings away from their seats when the vulcanizer is open, and a lever connected to one of said spindles for moving its bead ring out of its seat beyond the point to which it is moved by the yielding means, said lever being operated by the toggle mechanism.

11. In a vulcanizer for forming and vulcanizing rubber articles, the combination of a pair of mating, relatively movable mold sections, and means for moving said sections toward each other substantially in parallelism and for angularly moving the sections away from each other, whereby the said sections will concurrently engage all about the work to position it properly for forming upon the closing of the mold, and will separate progressively from the work by relative angular movement upon opening of the mold.

12. In a vulcanizer, the combination of a pair of relatively movable, mating mold sections, means for parting the mold by relative angular movement of said sections about an axis lying in the parting plane of the sections to effect progressive separation from the work, and means for closing the mold by relative axial movement of the sections while they are in parallelism.

13. In a vulcanizer, the combination of a pair of relatively movable, mating mold sections, means for parting the mold by relative angular movement of the sections about an axis lying in the parting plane of the mold, means for moving said sections into co-axial parallelism, and means for bringing the mold sections together to close the mold while they are in parallelism.

CATO IVERSON.